(12) United States Patent
Kwalk

(10) Patent No.: US 7,504,055 B2
(45) Date of Patent: *Mar. 17, 2009

(54) POLYETHYLENE BLEND COMPOSITIONS

(75) Inventor: Tae Hoon Kwalk, Belle Mead, NJ (US)

(73) Assignee: Univation Technologies, LLC, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/981,098

(22) Filed: Oct. 31, 2007

(65) Prior Publication Data

US 2008/0064817 A1   Mar. 13, 2008

Related U.S. Application Data

(62) Division of application No. 11/053,751, filed on Feb. 7, 2005, now Pat. No. 7,312,279.

(51) Int. Cl.
   B29C 47/00   (2006.01)
   B29C 49/00   (2006.01)
   B29C 49/04   (2006.01)
   C08L 23/00   (2006.01)
   C08L 23/04   (2006.01)

(52) U.S. Cl. .................... 264/177.1; 525/191; 525/240
(58) Field of Classification Search ............... 264/177.1; 525/240
   See application file for complete search history.

(56) References Cited

U.S. PATENT DOCUMENTS

| | | | |
|---|---|---|---|
| 3,709,853 A | 1/1973 | Karapinka | |
| 4,003,712 A | 1/1977 | Miller | |
| 4,011,382 A | 3/1977 | Levine et al. | |
| 4,077,904 A | 3/1978 | Noshay et al. | |
| 4,115,639 A | 9/1978 | Brown et al. | |
| 4,302,565 A | 11/1981 | Goeke et al. | |
| 4,302,566 A | 11/1981 | Karol et al. | |
| 4,336,352 A | 6/1982 | Sakurai et al. | |
| 4,482,687 A | 11/1984 | Noshay et al. | |
| 4,543,399 A | 9/1985 | Jenkins, III et al. | |
| 4,564,605 A | 1/1986 | Collomb-Ceccarini et al. | |
| 4,613,484 A | 9/1986 | Ayres et al. | |
| 4,721,763 A | 1/1988 | Bailly et al. | |
| 4,879,359 A | 11/1989 | Chamla et al. | |
| 4,882,400 A | 11/1989 | Dumain et al. | |
| 4,960,741 A | 10/1990 | Bailly et al. | |
| RE33,683 E | 9/1991 | Allen et al. | |
| 5,091,228 A | 2/1992 | Fujii et al. | |
| 5,093,415 A | 3/1992 | Brady, III et al. | |
| 5,110,685 A | 5/1992 | Cross et al. | |
| 5,208,309 A | 5/1993 | McDaniel et al. | |
| 5,274,056 A | 12/1993 | McDaniel et al. | |
| 5,283,278 A | 2/1994 | Daire et al. | |
| 5,288,933 A | 2/1994 | Kao et al. | |
| 5,290,745 A | 3/1994 | Jorgensen et al. | |
| 5,318,935 A | 6/1994 | Canich et al. | |
| 5,338,589 A | 8/1994 | Bohm et al. | |
| 5,344,884 A | 9/1994 | Benham et al. | |
| 5,352,749 A | 10/1994 | DeChellis et al. | |
| 5,378,764 A | 1/1995 | Benham et al. | |
| 5,494,965 A | 2/1996 | Harlin et al. | |
| 5,518,973 A | 5/1996 | Miro et al. | |
| 5,525,678 A | 6/1996 | Mink et al. | |
| 5,541,270 A | 7/1996 | Chinh et al. | |
| 5,635,262 A | 6/1997 | Best et al. | |
| 5,665,818 A | 9/1997 | Tilston et al. | |
| 5,677,375 A | 10/1997 | Rifi et al. | |
| 5,739,225 A | 4/1998 | Tazaki et al. | |
| 5,795,941 A | 8/1998 | Cree et al. | |
| 5,889,128 A | 3/1999 | Schrock et al. | |
| 6,090,893 A | 7/2000 | Harlin et al. | |
| 6,248,831 B1 * | 6/2001 | Maheshwari et al. | ........ 525/191 |
| 6,271,325 B1 | 8/2001 | McConville et al. | |
| 6,300,436 B1 | 10/2001 | Agapiou et al. | |
| 6,333,389 B2 | 12/2001 | Whiteker et al. | |
| 6,340,730 B1 | 1/2002 | Murray et al. | |
| 6,344,522 B1 | 2/2002 | Promel | |
| 6,359,072 B1 | 3/2002 | Whaley | |
| 6,388,017 B1 | 5/2002 | McDaniel et al. | |
| 6,388,115 B1 | 5/2002 | Crowther et al. | |
| 6,403,717 B1 | 6/2002 | Adams et al. | |
| 6,420,580 B1 | 7/2002 | Holtcamp et al. | |
| 6,441,096 B1 | 8/2002 | Backman et al. | |
| 6,472,484 B1 | 10/2002 | Abe et al. | |
| 6,476,166 B1 | 11/2002 | Holtcamp et al. | |
| 6,489,427 B1 | 12/2002 | Clutton et al. | |
| 6,506,866 B2 | 1/2003 | Jacobsen et al. | |
| 6,525,148 B1 | 2/2003 | McDaniel et al. | |
| 6,534,604 B2 | 3/2003 | Loveday et al. | |
| 6,545,093 B1 | 4/2003 | De Lange et al. | |

(Continued)

FOREIGN PATENT DOCUMENTS

BE   839380   3/1977

(Continued)

*Primary Examiner*—Nathan M Nutter
(74) *Attorney, Agent, or Firm*—Leandro Arechederra, III; Kevin M. Faulkner

(57) ABSTRACT

Disclosed herein are various processes, including a process for producing a film, comprising (including) forming a film from a blended polyolefin composition at a line speed of at least 170 feet per minute, wherein the blended polyolefin composition comprises: (a) a bimodal polyethylene component that includes a high molecular weight polyethylene component having a high average molecular weight ($MW_{HMW}$) and a low molecular weight polyethylene component having a low average molecular weight ($MW_{LMW}$), wherein the ratio of the high average molecular weight to the low average molecular weight ($MW_{HMW}:MW_{LMW}$) is 20 or more wherein the high and low molecular weight polyethylene components of the bimodal polyethylene component are formed in a single reactor; and (b) a unimodal polyethylene component that occupies more than 15 wt % of the composition.

22 Claims, No Drawings

U.S. PATENT DOCUMENTS

| | | | |
|---|---|---|---|
| 6,562,905 B1 | 5/2003 | Nummila-Pakarinen et al. | |
| 6,566,450 B2 | 5/2003 | Debras et al. | |
| 6,579,922 B2 | 6/2003 | Laurent | |
| 6,605,675 B2 | 8/2003 | Mawson et al. | |
| 6,608,149 B2 | 8/2003 | Mawson et al. | |
| 7,312,279 B2 * | 12/2007 | Kwalk | 525/191 |

FOREIGN PATENT DOCUMENTS

| | | |
|---|---|---|
| EP | 0 102 503 A2 | 3/1984 |
| EP | 0 103 120 A2 | 3/1984 |
| EP | 0 231 102 A2 | 8/1987 |
| EP | 0 517 868 | 7/1994 |
| EP | 0 703 246 A1 | 3/1996 |
| EP | 0 794 200 A2 | 9/1997 |
| EP | 0 802 202 A1 | 10/1997 |
| EP | 0 893 454 A1 | 1/1999 |
| EP | 1 041 113 A1 | 10/2000 |
| EP | 1 146 078 A1 | 10/2001 |
| WO | WO 94/22948 A1 | 10/1994 |
| WO | WO 97/47682 A1 | 12/1997 |
| WO | WO 99/01460 A1 | 1/1999 |
| WO | WO 02/102891 A1 | 12/2002 |
| WO | WO 03/016396 A1 | 2/2003 |

* cited by examiner

POLYETHYLENE BLEND COMPOSITIONS

CROSS-REFERENCE TO RELATED APPLICATIONS

This application is a Divisional application under 37 C.F.R. 1.53(b) of and claims priority under 35 U.S.C. §120 to U.S. patent application Ser. No. 11/053,751 filed on Feb. 7, 2005 now U.S. Pat. No. 7,312,279. This application is hereby incorporated by reference in its entirety.

BACKGROUND

1. Field of Invention

Embodiments of the present invention generally relate to processes for producing films from compositions containing blends of polyethylenes, particularly processes for producing films from compositions containing blends of bimodal polyethylene and unimodal polyethylene, and film resin compositions.

2. Description of Related Art

Polyethylene compositions have been used to make films, including bimodal polyethylene compositions. Bimodal polyethylene compositions have numerous advantages over unimodal polyethylene compositions, and have solved various problems in the art. High molecular weight bimodal high density polyethylene compositions have been used to make film as well as pipes. Unlike pipe resins, a film resin has to satisfy several critical processing attributes: bubble stability, draw-down capability, and film quality. Many good bimodal pipe resins do not necessarily serve as good film resins, which require the above mentioned film processing attributes. In some cases, certain bimodal pipe resins exhibit poor bubble stability and poor film quality, when they are film extruded, with undesirable film texture where many hazy lines are dispersed all over the film surface, and therefore are unsatisfactory for film applications.

The undesirable film texture of hazy lines dispersed on the film surface is believed to stem from inhomogeneous molten polymer. When the bimodal polyethylene, which consists of high molecular weight component and low molecular weight component, is extruded from an annular die and expanded to form a blown bubble, crystallization takes place near the frost line. If the two components of the bimodal polyethylene are not well homogenized in a molten state, either due to their huge disparity in molecular weight or in viscosity, the respective component crystallizes separately forming discrete phases in a solid state. This results in poor film texture with hazy lines dispersed all over the film surface.

The homogeneity of bimodal polyethylene is believed to be dependent on the degree of spread, which describes the bimodality of the bimodal polyethylene, i.e., the relative distance between the two molecular weight peaks of component polymers, which can be seen from a size exclusion chromatography. It appears to be an optimum range of spread that prevents a blown film of bimodal polyethylene from being resulted in poor film texture.

Often, bimodal polyethylenes of poor film texture are accompanied with poor bubble stability. The inhomogeneity of the molten polymer leads to poor melt strength, which results in a limited capability of film blowability, i.e., poor bubble stability and, poor draw-down capability.

An ongoing need exists for further understanding on the film blowability of polyethylene resin, particularly for bimodal polyethylene compositions used to make films. This invention discusses polyethylene compositions that comprise of bimodal polyethylene having a wider spread and unimodal polyethylene.

Earlier patents and published applications describe various aspects of polyethylene compositions that contain mixtures of different types of polyethylenes, including Sakurai et al., U.S. Pat. No. 4,336,352 which involves blends of different ethylene polymers; Whaley, U.S. Pat. No. 6,359,072, which involves films formed from blends of polyethylene resins; Debras et al., U.S. Pat. No. 6,566,450, relates to multimodal polyethylenes; Laurent, U.S. Pat. No. 6,579,922 involves pipe resin blends that include bimodal polyethylene; McDaniel et al., U.S. Pat. No. 6,525,148, relates to catalyst systems for making polyethylenes; Clutton et al., U.S. Pat. No. 6,489,427, relates to polymer compositions; McDaniel et al., U.S. Pat. No. 6,388,017, relates to various polymer compositions; de Lange et al., U.S. Pat. No. 6,545,093, relates to bimodal polyethylene blends; Nummila-Parkarinen et al., U.S. Pat. No. 6,562,905, relates to high density polyethylene compositions; Promel, U.S. Pat. No. 6,344,522, relates to ethylene polymer compositions; Jacobsen et al., U.S. Pat. No. 6,506,866 relates to ethylene copolymer compositions; Vandun et al., PCT Application WO 03/016396, relates to bimodal polyethylene compositions; Mattioli et al., PCT Application WO 02/102891 relates to ethylene polymer compositions; Ahistrand, EP 1 146 078, relates to polymer compositions for pipes; and Laurent, EP 1 041 113, relates to polyolefins.

Also, patents that refer to films and/or polyethylene compositions, as well as methods for making polyethylene, include the following: U.S. Pat. Nos. 4,336,352; 5,091,228; 5,110,685; 5,208,309; 5,274,056; 5,635,262; 5,338,589; 5,344,884; 5,378,764; 5,494,965; 5,739,225; 5,795,941; 6,090,893; 6,340,730; 6,359,072; 6,388,017; 6,388,115; 6,403,717; 6,420,580; 6,441,096; 6,476,166; 6,534,604; 6,562,905; 6,605,675; 6,608,149; and WO 97/47682 and WO 94/22948. Other patents and publications are listed on the cover page of the patent.

SUMMARY

Disclosed herein are various processes, including processes for producing a film, comprising (including) forming a film from a blended polyolefin composition at a line speed of at least 170 feet per minute, wherein the blended polyolefin composition comprises: (a) a bimodal polyethylene component that includes a high molecular weight polyethylene component having a high average molecular weight ($MW_{HMW}$) and a low molecular weight polyethylene component having a low average molecular weight ($MW_{LMW}$), wherein the ratio of the high average molecular weight to the low average molecular weight ($MW_{HMW}$:$MW_{LMW}$) is 20 or more wherein the high and low molecular weight polyethylene components of the bimodal polyethylene component are formed in a single reactor; and (b) a unimodal polyethylene component that occupies more than 15 wt % of the composition.

Specific embodiments of these and other processes are disclosed below.

DETAILED DESCRIPTION

Definitions and Properties

Various terms as used herein are defined below. To the extent a term is used in a claim is not defined below, or elsewhere herein, it should be given the broadest definition that persons in the pertinent art have given that term as reflected in printed publications and issued patents.

For purposes of convenience, various specific test procedures are identified for determining properties such as PDI, FI and MFR. However, when a person of ordinary skill reads this patent and wishes to determine whether a composition or polymer has a particular property identified in a claim, then any published or well-recognized method or test procedure can be followed to determine that property, although the specifically identified procedure is preferred. Each claim should be construed to cover the results of any of such procedures, even to the extent different procedures may yield different results or measurements. Thus, a person of ordinary skill in the art is to expect experimental variations in measured properties that are reflected in the claims. All numerical values can be considered to be "about" or "approximately" the stated value, in view of the nature of testing in general.

Density is a physical property of a composition, is determined in accordance with ASTM-D-1505, and is expressed as grams per cubic centimeter (or grams per milliliter).

Except to the extent the actual density is specified, the term "high density" means any density of 0.935 g/cc or above, preferably 0.945 g/cc or above, or more preferably 0.950 g/cc or above, and a preferable range of a high density composition is from 0.945 g/cc to 0.967 g/cc.

The term "polyethylene" means a polymer made of at least 50% ethylene-derived units, preferably at least 70% ethylene-derived units, more preferably at least 80% ethylene-derived units, or 90% ethylene-derived units, or 95% ethylene-derived units, or even 100% ethylene-derived units. The polyethylene can thus be a homopolymer or a copolymer, including a terpolymer, having other monomeric units. A polyethylene described herein may, for example, include units derived from a co-monomer that is preferably an α-olefin, e.g., propylene, 1-butene, 1-pentene, 1-hexene, or 1-octene. Other embodiments may include ethacrylate or methacrylate.

As used herein, the term "PDI" means polydispersity index, and means the same thing as "MWD" (molecular weight distribution), which is characterized herein using Size-Exclusion Chromatography (SEC).

The term "multimodal polyethylene composition" as used herein, means a composition that includes at least a bimodal polyethylene (or multimodal polyethylene), but the meaning of the term also encompasses a composition that is preferred herein, which is a blend of a bimodal polyethylene and a unimodal polyethylene.

The term "bimodal," when used herein to describe a polymer or polymer composition, e.g., polyethylene, means "bimodal molecular weight distribution," which term is understood as having the broadest definition persons in the pertinent art have given that term as reflected in printed publications and issued patents. For example, a single composition that includes polyolefins with at least one identifiable high molecular weight distribution and polyolefins with at least one identifiable low molecular weight distribution is considered to be a "bimodal" polyolefin, as that term is used herein. Preferably, other than having different molecular weights, the high molecular weight polyolefin and the low molecular weight polyolefin are both polyethylenes but may have different levels of comonomer distribution. A material with more than two different molecular weight distributions (sometimes referred to as a "multimodal" polymer) will be considered "bimodal" as that term is used herein.

The term "unimodal," as used herein to describe a polymer or polymer composition, means any polymer, e.g., polyethylene, that is not bimodal as defined above, e.g., one having a single molecular weight distribution.

The term "dual catalyst system" includes a bimetallic catalyst as well as a multiple-catalyst system, and includes any composition, mixture or system that includes at least two different catalyst compounds, each having a different metal group. Preferably, each different catalyst compound resides on a single support particle, so that the dual or bimetallic catalyst is a supported dual or bimetallic catalyst. However, as used herein, the term bimetallic catalyst also broadly includes a system or mixture in which one of the catalysts resides on one collection of support particles, and another catalyst resides on another collection of support particles. Preferably, in that latter instance, the two supported catalysts are introduced to a single reactor, either simultaneously or sequentially, and polymerization is conducted in the presence of the dual or bimetallic catalyst system, i.e., the two collections of supported catalysts.

Also, the term "dual catalyst system" that includes a bimetallic catalyst as well as a multiple-catalyst system, and includes any composition, mixture or system that includes at least two different catalyst compounds, each having a different metal group, can be slurried together with the supported MAO (methyl aluminoxane). The slurried catalysts, mixed either on line or off line, are introduced to a single reactor, and polymerization is conducted.

The term "FI" means $I_{21}$, which is measured in accordance with ASTM-1238, Condition E, at 190 degrees C.

The term "MFR $(I_{21}/I_2)$" means the ratio of $I_{21}$ (also referred to as FI) to $I_2$, and both $I_{21}$ and $I_2$ are measured in accordance with ASTM-1238, Condition E, at 190 degrees C.

The "overall" number average, weight average, and z-average molecular weight are terms that refer to the molecular weight values for the entire composition, as opposed to that of any individual component. Overall molecular weight values referenced in the claims encompass any value as determined by any published method, including those mentioned in the paragraph above; however, a preferred method is using an SEC curve.

The number average, weight average and z-average molecular weight (particularly the weight average molecular weight) of a particular polyethylene component recited in the claims, e.g., the high molecular weight component and the low molecular weight component, can also be determined any published method, including those mentioned in the paragraphs above; however, a preferred method is using any published deconvolution procedure, e.g., any published technique for elucidating each individual component polymer's molecular information in a bimodal polymer. A particularly preferred technique is one that uses a Flory deconvolution, including but not limited to the Flory procedures set forth in U.S. Pat. No. 6,534,604 which is incorporated by reference in its entirety. Any program that incorporates the principles contained in the following reference is useful: P. J. Flory, Principles of Polymer Chemistry, Cornell University Press, New York 1953. Any computer program capable of fitting an experimental molecular weight distribution with multiple Flory or log-normal statistical distributions is useful. The Flory distribution can be expressed as follows:

$$Y = A_o \left(\frac{M}{M_n}\right)^2 e^{\left(\frac{M}{M_n}\right)}$$

In this equation, here Y is the weight fraction of polymer corresponding to the molecular species M, Mn is the number average molecular weight of the distribution, and $A_o$ is the weight fraction of the site generating the distribution. Y can be shown to be proportional to the differential molecular weight distribution (DMWD) which is the change in concentration with the change in log-molecular weight. The SEC chromatogram represents the DMWD. Any computer program that minimizes the square of the difference between the experimental and calculated distributions by varying the $A_o$ and Mn for each Flory distribution is preferred. Particularly preferred is any program that can handle up to 8 Flory distributions. A commercially available program, called Excel Solver, offered by Frontline Systems, Inc. at www.solver.com can be used to perform the minimization. Using this program, special constraints can be placed on the individual Flory distributions that allow one to fit chromatograms of experimental blends and bimodal distributions.

Bimodal distributions can be fit with two individual groups of four constrained Flory distributions, for a total of eight distributions. One constrained group of four fits the low molecular weight component while the other group fits the high molecular weight component. Each constrained group is characterized by $A_o$ and Mn of the lowest molecular weight component in the group and the ratios $A_o(n)/A_o(1)$ and $Mn(n)/Mn(1)$ for each of the other three distributions (n=2, 3,4). Although the total number of degrees of freedom is the same for the constrained fit as for eight unconstrained Flory distributions, the presence of the constraint is needed to more accurately determine the contribution to the total chromatogram of the individual low molecular weight and high molecular weight components in a bimodal polymer. Once the fitting process is complete, the program will then calculate the molecular weight statistics and weight percents of the individual high and low molecular weight components. FIG. 1 depicts a deconvoluted curve of each individual component.

The term "split" is defined herein as the weight % of a high molecular weight component in a bimodal composition. Thus, it describes the relative amount of the higher molecular weight component against the lower molecular weight component in a bimodal polyethylene composition, including any of the polymer compositions described herein. The weight % of each component can polymer is also be represented by the area of each molecular weight distribution curve that is seen after deconvolution of the overall molecular weight distribution curve.

The term "spread" as used herein means the ratio of the weight average molecular weight of the high molecular weight polyethylene component, sometimes referred to as $Mw_{HMW}$, to the weight average molecular weight of the low molecular weight polyethylene component, sometimes referred to as $Mw_{LMW}$. The "spread" can therefore be also expressed as the ratio of $Mw_{HMW}$:$Mw_{LMW}$. Weight average molecular weight of each component can be obtained by deconvolution of an overall SEC curve, i.e., an SEC curve of an entire composition.

As used herein (e.g., in the claims), the term "maximum line speed" ("Maximum Line Speed" or MLS) is a measured property of a polymer, blend or other composition, and is defined as the maximum line speed as that term is used by persons skilled in the art of making film (discussed below), based on the particular extrusion equipment and conditions set forth in Example 1, below. In the art of making film, the maximum line speed refers to a particular take-up speed at which the blown bubble starts to show symptoms of "bubble instability," a characteristic recognized by persons skilled in the art of making polyethylene film. When a film is being formed during the blown film extrusion process, take-up speed is slowly increased for a given output rate (which can be set by a fixed screw rpm), a given melt extrusion temperature (which can be set by the die temperature) and cooling air flow rate. As the take-up speed is increased, the blown bubble becomes thinner and thinner. A higher take-up speed yields thinner film, which is typically more desirable since less resin is needed to produce a given amount of film goods. However, take-up speed is limited by bubble instability, which is seen, for example, by up-and-down movement of frost line height, dancing around or twisting of a blown bubble along the center axis, or the oscillation or wobbling of a blown bubble along its axis. Bubble instability can be made to disappear by reducing take-up speed. The Maximum Line Speed is expressed herein in units of feet per minute (fpm), and it is understood herein that each Maximum Line Speed value includes plus or minus 10%, i.e., the recognition that experimental, equipment and/or operator error can cause a variance of plus or minus 10% for a given composition.

SPECIFIC EMBODIMENTS

Various specific embodiments are described below, at least some of which are also recited in the claims. In one embodiment, the composition described in the summary, or the composition described in the claims, or any of the compositions described herein, can have some of the following characteristics The polyethylene composition can in some cases be formed into a film, preferably an extruded film, but also blown film or other types of films.

In at least certain embodiments, the overall spread is less than 95% of the bimodal polyethylene spread, while in other embodiments, the overall spread is 90% or less, or 85% or less, or 80% or less, or 75% or less of the bimodal polyethylene spread. The "overall spread" is defined herein as the ratio of the weight average molecular weight of the high molecular weight component of the composition (the blend) to the weight average molecular weight of the low molecular weight component of the composition, and a "bimodal polyethylene spread," defined as the ratio of the weight average molecular weight of the high molecular weight component of the bimodal polyethylene component to the weight average molecular weight of the low molecular weight component of the bimodal polyethylene component. It is noted that the "bimodal polyethylene spread" is determined without the presence of any portion of the unimodal polyethylene component, e.g., before the bimodal component and the unimodal component are blended.

Preferably, in the polyethylene composition described in the summary and elsewhere herein, the unimodal polyethylene component has a molecular weight distribution peak falling between two peaks of the bimodal polyethylene.

The unimodal polyethylene component can in certain cases occupy more than 30 wt % of the composition.

The bimodal polyethylene component can in certain cases occupy more than 50 wt % of the composition.

The unimodal polyethylene component can in certain cases have a density of 0.935 g/cc or more and a PDI of 8 or more.

The bimodal polyethylene component can in certain cases have a density of 0.935 g/cc or more and a spread of 20 or more.

The bimodal polyethylene component can in certain cases have a density of 0.935 g/cc or more and a PDI of 20 or more.

The PDI of the high molecular weight component of the bimodal polyethylene can in certain cases be greater than 3.5.

The PDI of the low molecular weight component of the bimodal polyethylene can in certain cases be 2.5 or more.

The average molecular weight of the composition can in certain cases be 200,000 or more.

The ratio of high average molecular weight to the low average molecular weight can in certain cases be 10 or more.

The average molecular weight of the bimodal polyethylene component can in certain cases be 250,000 or more.

The FI ($I_{21}$) of the composition can in certain cases be from 5 to 15 g/10 min.

The FI ($I_{21}$) of the bimodal polyethylene component can in certain cases be from 5 to 15 g/10 min.

The MFR ($I_{21}/I_2$) of the composition can in certain cases be from 70 to 250.

The MFR ($I_{21}/I_2$) of the bimodal polyethylene component can in certain cases be from 70 to 250.

The high molecular weight polyethylene component can in certain cases occupy 40 wt % or more of the bimodal polyethylene component.

The high and low molecular weight polyethylene components of the bimodal polyethylene component can in certain cases be formed in a single reactor.

The high and low molecular weight polyethylene components of the bimodal polyethylene component can in certain cases be formed in gas phase polymerization.

The bimodal polyethylene component can in certain cases be made from polymerization conducted in the presence of a multiple catalyst system that includes a metallocene based catalyst.

The bimodal polyethylene component can in certain cases be made from polymerization conducted in the presence of a multiple catalyst system that includes a Zieglar-Natta based catalyst.

The high and low molecular weight polyethylene components of the bimodal polyethylene component can in certain cases be formed from polymerization conducted in the presence of a multiple catalyst system that includes bis(2-(trimethylphenylamido)ethyl)amine zirconium dibenzyl.

The high and low molecular weight polyethylene components of the bimodal polyethylene component can in certain cases be formed from polymerization conducted in the presence of a multiple catalyst system that includes bis(2-(pentamethyl-phenylamido)ethyl)amine zirconium dibenzyl.

The high and low molecular weight polyethylene components of the bimodal polyethylene component can in certain cases be formed from polymerization conducted in the presence of a multiple catalyst system that includes pentamethylcyclopentadienyl, n-propylcyclopentadienyl zirconium dichloride.

The unimodal polyethylene component can in certain cases be formed in gas phase polymerization.

The unimodal polyethylene component can in certain cases be formed from a polymerization conducted in the presence of chromium based catalysts.

The composition can in certain cases have a high molecular weight polyethylene component having a high weight average molecular weight ($MW_{HMW}$) and a low molecular weight polyethylene component having a low weight average molecular weight ($MW_{LMW}$) wherein the spread is less than 95% of the spread of the bimodal component.

One or more specific embodiments of the compositions described herein include a bimodal polyethylene. In certain embodiments, a bimodal polyethylene for the composition may be prepared as described in U.S. Pat. Nos. 6,605,675 or 6,608,149, both of which are incorporated by reference, particularly the aspects that disclose and teach the preparation of bimodal polyethylene.

Polymerization Processes

The polymerization process used to form any of the polymers described herein, e.g., either of the polyethylene components used to make the blends, may be carried out using any suitable process, for example, high pressure, solution, slurry or gas phase. The blends may in certain embodiments be "reactor blends" that involve the use of two or more sequential, e.g., cascading, reactors; or the blends may in certain embodiments be physical blends; or in certain embodiments the blends may be made using a single reactor using two or more catalysts (same or different), but preferably the blends are formed in a single gas-phase reactor using a bimetallic catalyst system.

Certain polyethylenes can be made using a gas phase polymerization process, e.g., utilizing a fluidized bed reactor. This type reactor and means for operating the reactor are well known and completely described in, for example, U.S. Pat. Nos. 3,709,853; 4,003,712; 4,011,382; 4,302,566; 4,543,399; 4,882,400; 5,352,749; 5,541,270; EP-A-0 802 202 and Belgian Patent No. 839,380. These patents disclose gas phase polymerization processes wherein the polymerization medium is either mechanically agitated or fluidized by the continuous flow of the gaseous monomer and diluent.

In one embodiment, any of the polyethylene components may be polymerized using a continuous gas phase process such as a fluid bed process, for example. A fluid bed reactor may comprise a reaction zone and a so-called velocity reduction zone. The reaction zone may comprise a bed of growing polymer particles, formed polymer particles and a minor amount of catalyst particles fluidized by the continuous flow of the gaseous monomer and diluent to remove heat of polymerization through the reaction zone. Optionally, some of the re-circulated gases may be cooled and compressed to form liquids that increase the heat removal capacity of the circulating gas stream when readmitted to the reaction zone. A suitable rate of gas flow may be readily determined by simple experiment. Make up of gaseous monomer to the circulating gas stream is at a rate equal to the rate at which particulate polymer product and monomer associated therewith is withdrawn from the reactor and the composition of the gas passing through the reactor is adjusted to maintain an essentially steady state gaseous composition within the reaction zone. The gas leaving the reaction zone is passed to the velocity reduction zone where entrained particles are removed. Finer entrained particles and dust may be removed in a cyclone and/or fine filter. The gas is passed through a heat exchanger wherein the heat of polymerization is removed, compressed in a compressor and then returned to the reaction zone.

The reactor temperature of the fluid bed process herein preferably ranges from 30° C. or 40° C. or 50° C. to 90° C. or 100° C. or 110° C. or 120° C. or 150° C. In general, the reactor temperature is operated at the highest temperature that is feasible taking into account the sintering temperature of the polymer product within the reactor. Regardless of the process used to make the polyolefins of the invention, the polymerization temperature, or reaction temperature should be below the melting or "sintering" temperature of the polymer to be formed. Thus, the upper temperature limit in one embodiment is the melting temperature of the polyolefin produced in the reactor.

A slurry polymerization process can also be used. A slurry polymerization process generally uses pressures in the range of from 1 to 50 atmospheres and even greater and temperatures in the range of 0° C. to 120° C., and more particularly from 30° C. to 100° C. In a slurry polymerization, a suspension of solid, particulate polymer is formed in a liquid polymerization diluent medium to which ethylene and comonomers and often hydrogen along with catalyst are added. The suspension including diluent is intermittently or continuously removed from the reactor where the volatile components are separated from the polymer and recycled, optionally after a distillation, to the reactor. The liquid diluent employed in the polymerization medium is typically an alkane having from 3 to 7 carbon atoms, a branched alkane in one embodiment. The medium employed should be liquid under the conditions of polymerization and relatively inert. When a propane medium is used the process must be operated above the reaction diluent critical temperature and pressure. In one embodiment, a hexane, isopentane or isobutane medium is employed.

Also useful is particle form polymerization, a process where the temperature is kept below the temperature at which the polymer goes into solution. Other slurry processes include those employing a loop reactor and those utilizing a plurality of stirred reactors in series, parallel, or combinations thereof. Non-limiting examples of slurry processes include continuous loop or stirred tank processes. Also, other examples of slurry processes are described in U.S. Pat. No. 4,613,484 and 2 Metallocene-Based Polyolefins 322-332 (2000).

These processes can be used for the production of homopolymers of olefins, particularly ethylene, and/or copolymers, terpolymers, and the like, of olefins, particularly ethylene, and at least one or more other olefin(s). Preferably the olefins are α-olefins. The olefins, for example, may contain from 2 to 16 carbon atoms in one embodiment; and in another embodiment, ethylene and a comonomer comprising from 3 to 12 carbon atoms in another embodiment; and ethylene and a comonomer comprising from 4 to 10 carbon atoms in yet another embodiment; and ethylene and a comonomer comprising from 4 to 8 carbon atoms in yet another embodiment. Particularly preferred are polyethylenes. Such polyethylenes are preferably homopolymers of ethylene and interpolymers of ethylene and at least one α-olefin wherein the ethylene content is at least about 50% by weight of the total monomers involved. Exemplary olefins that may be utilized herein are ethylene, propylene, 1-butene, 1-pentene, 1-hexene, 1-heptene, 1-octene, 4-methylpent-1-ene, 1-decene, 1-dodecene, 1-hexadecene and the like. Also utilizable herein are polyenes such as 1,3-hexadiene, 1,4-hexadiene, cyclopentadiene, dicyclopentadiene, 4-vinylcyclohex-1-ene, 1,5-cyclooctadiene, 5-vinylidene-2-norbornene and 5-vinyl-2-norbornene, and olefins formed in situ in the polymerization medium. When olefins are formed in situ in the polymerization medium, the formation of polyolefins containing long chain branching may occur.

In the production of polyethylene or polypropylene, comonomers may be present in the polymerization reactor. When present, the comonomer may be present at any level with the ethylene or propylene monomer that will achieve the desired weight percent incorporation of the comonomer into the finished resin. In one embodiment of polyethylene production, the comonomer is present with ethylene in a mole ratio range of from 0.0001 (comonomer:ethylene) to 50, and from 0.0001 to 5 in another embodiment, and from 0.0005 to 1.0 in yet another embodiment, and from 0.001 to 0.5 in yet another embodiment. Expressed in absolute terms, in making polyethylene, the amount of ethylene present in the polymerization reactor may range to up to 1000 atmospheres pressure in one embodiment, and up to 500 atmospheres pressure in another embodiment, and up to 200 atmospheres pressure in yet another embodiment, and up to 100 atmospheres in yet another embodiment, and up to 50 atmospheres in yet another embodiment.

Hydrogen gas is often used in olefin polymerization to control the final properties of the polyolefin, such as described in Polypropylene Handbook 76-78 (Hanser Publishers, 1996). Using certain catalyst systems, increasing concentrations (partial pressures) of hydrogen can increase the melt flow rate (MFR) (also referred to herein as melt index (MI)) of the polyolefin generated. The MFR or MI can thus be influenced by the hydrogen concentration. The amount of hydrogen in the polymerization can be expressed as a mole ratio relative to the total polymerizable monomer, for example, ethylene, or a blend of ethylene and hexane or propene. The amount of hydrogen used in the polymerization process of the present invention is an amount necessary to achieve the desired MFR or MI of the final polyolefin resin. In one embodiment, the mole ratio of hydrogen to total monomer ($H_2$:monomer) is in a range of from greater than 0.0001 in one embodiment, and from greater than 0.0005 in another embodiment, and from greater than 0.001 in yet another embodiment, and less than 10 in yet another embodiment, and less than 5 in yet another embodiment, and less than 3 in yet another embodiment, and less than 0.10 in yet another embodiment, wherein a desirable range may comprise any combination of any upper mole ratio limit with any lower mole ratio limit described herein. Expressed another way, the amount of hydrogen in the reactor at any time may range to up to 5000 ppm, and up to 4000 ppm in another embodiment, and up to 3000 ppm in yet another embodiment, and between 50 ppm and 5000 ppm in yet another embodiment, and between 500 ppm and 2000 ppm in another embodiment.

Further, it is common to use a staged reactor employing two or more reactors in series, wherein one reactor may produce, for example, a high molecular weight component and another reactor may produce a low molecular weight component. In one embodiment of the invention, the polyolefin is produced using a staged gas phase reactor. Such commercial polymerization systems are described in, for example, 2 Metallocene-Based Polyolefins 366-378 (John Scheirs & W. Kaminsky, eds. John Wiley & Sons, Ltd. 2000); U.S. Pat. No. 5,665,818, U.S. Pat. No. 5,677,375; U.S. Pat. No. 6,472,484; EP 0 517 868 and EP-A-0 794 200.

The one or more reactor pressures in a gas phase process (either single stage or two or more stages) may vary from 100 psig (690 kPa) to 500 psig (3448 kPa), and in the range of from 200 psig (1379 kPa) to 400 psig (2759 kPa) in another embodiment, and in the range of from 250 psig (1724 kPa) to 350 psig (2414 kPa) in yet another embodiment.

The gas phase reactor employing the catalyst system described herein is capable of producing from 500 lbs of polymer per hour (227 Kg/hr) to 200,000 lbs/hr (90,900 Kg/hr), and greater than 1000 lbs/hr (455 Kg/hr) in another embodiment, and greater than 10,000 lbs/hr (4540 Kg/hr) in yet another embodiment, and greater than 25,000 lbs/hr (11,300 Kg/hr) in yet another embodiment, and greater than 35,000 lbs/hr (15,900 Kg/hr) in yet another embodiment, and greater than 50,000 lbs/hr (22,700 Kg/hr) in yet another embodiment, and from 65,000 lbs/hr (29,000 Kg/hr) to 100,000 lbs/hr (45,500 Kg/hr) in yet another embodiment.

A slurry or gas phase process can be operated in the presence of a bulky ligand metallocene-type catalyst system and in the absence of, or essentially free of, any scavengers, such as triethylaluminum, trimethylaluminum, tri-isobutylaluminum and tri-n-hexylaluminum and diethyl aluminum chloride, dibutyl zinc and the like. By "essentially free", it is meant that these compounds are not deliberately added to the reactor or any reactor components, and if present, are present to less than 1 ppm in the reactor.

One or all of the catalysts can be combined with up to 10 wt % of a metal-fatty acid compound, such as, for example, an aluminum stearate, based upon the weight of the catalyst system (or its components), such as disclosed in U.S. Pat. Nos. 6,300,436 and 5,283,278. Other suitable metals include other Group 2 and Group 5-13 metals. In an alternate embodiment, a solution of the metal-fatty acid compound is fed into the reactor. In yet another embodiment, the metal-fatty acid compound is mixed with the catalyst and fed into the reactor separately. These agents may be mixed with the catalyst or may be fed into the reactor in a solution or a slurry with or without the catalyst system or its components.

Supported catalyst(s) can be combined with the activators and are combined, such as by tumbling and other suitable means, with up to 2.5 wt % (by weight of the catalyst composition) of an antistatic agent, such as an ethoxylated or methoxylated amine, an example of which is Kemamine AS-990 (ICI Specialties, Bloomington Del.).

Catalysts

All polymerization catalysts including conventional transition metal catalysts and metallocene catalysts or combinations thereof, are suitable for use in embodiments of the processes of the present invention. Also contemplated are catalysts such as AlCl3, cobalt, iron, palladium, chromium/chromium oxide or "Phillips" catalysts. The following is a non-limiting discussion of the various polymerization catalysts useful in the invention.

General Definitions relating to Catalysts

As used herein, the phrase "catalyst system" includes at least one "catalyst component" and at least one "activator", alternately at least one cocatalyst. The catalyst system may also include other components, such as supports, and is not limited to the catalyst component and/or activator alone or in combination. The catalyst system may include any number of catalyst components in any combination as described herein, as well as any activator in any combination as described herein.

As used herein, the phrase "catalyst compound" includes any compound that, once appropriately activated, is capable of catalyzing the polymerization or oligomerization of olefins, the catalyst compound comprising at least one Group 3 to Group 12 atom, and optionally at least one leaving group bound thereto.

As used herein, the phrase "leaving group" refers to one or more chemical moieties bound to the metal center of the catalyst component that can be abstracted from the catalyst component by an activator, thus producing the species active towards olefin polymerization or oligomerization. The activator is described further below.

As used herein, in reference to Periodic Table "Groups" of Elements, the "new" numbering scheme for the Periodic Table Groups are used as in the CRC Handbook of Chemistry and Physics (David R. Lide ed., CRC Press $81^{st}$ ed. 2000).

As used herein, the term "substituted" means that the group following that term possesses at least one moiety in place of one or more hydrogens in any position, the moieties selected from such groups as halogen radicals (for example, Cl, F, Br), hydroxyl groups, carbonyl groups, carboxyl groups, amine groups, phosphine groups, alkoxy groups, phenyl groups, naphthyl groups, $C_1$ to $C_{10}$ alkyl groups, $C_2$ to $C_{10}$ alkenyl groups, and combinations thereof. Examples of substituted alkyls and aryls includes, but are not limited to, acyl radicals, alkylamino radicals, alkoxy radicals, aryloxy radicals, alkylthio radicals, dialkylamino radicals, alkoxycarbonyl radicals, aryloxycarbonyl radicals, carbomoyl radicals, alkyl- and dialkyl-carbamoyl radicals, acyloxy radicals, acylamino radicals, arylamino radicals, and combinations thereof.

Metallocene Catalyst Component

The catalyst system useful in embodiments of the present invention include at least one metallocene catalyst component as described herein. Metallocene catalyst compounds are generally described throughout in, for example, 1 & 2 Metallocene-Based Polyolefins (John Scheirs & W. Kaminsky eds., John Wiley & Sons, Ltd. 2000); G. G. Hlatky in 181 Coordination Chem. Rev. 243-296 (1999) and in particular, for use in the synthesis of polyethylene in 1 Metallocene-Based Polyolefins 261-377 (2000). The metallocene catalyst compounds as described herein include "half sandwich" and "full sandwich"compounds having one or more Cp ligands (cyclopentadienyl and ligands isolobal to cyclopentadienyl) bound to at least one Group 3 to Group 12 metal atom, and one or more leaving group(s) bound to the at least one metal atom. Hereinafter, these compounds will be referred to as "metallocenes" or "metallocene catalyst components". The metallocene catalyst component is supported on a support material in an embodiment, and may be supported with or without another catalyst component.

The Cp ligands are one or more rings or ring system(s), at least a portion of which includes π-bonded systems, such as cycloalkadienyl ligands and heterocyclic analogues. The ring(s) or ring system(s) typically comprise atoms selected from the group consisting of Groups 13 to 16 atoms, or the atoms that make up the Cp ligands are selected from the group consisting of carbon, nitrogen, oxygen, silicon, sulfur, phosphorous, germanium, boron and aluminum and combinations thereof, wherein carbon makes up at least 50% of the ring members. Or the Cp ligand(s) are selected from the group consisting of substituted and unsubstituted cyclopentadienyl ligands and ligands isolobal to cyclopentadienyl, non-limiting examples of which include cyclopentadienyl, indenyl, fluorenyl and other structures. Further non-limiting examples of such ligands include cyclopentadienyl, cyclopentaphenanthreneyl, indenyl, benzindenyl, fluorenyl, octahydrofluorenyl, cyclooctatetraenyl, cyclopentacyclododecene, phenanthrindenyl, 3,4-benzofluorenyl, 9-phenylfluorenyl, 8-H-cyclopent[a]acenaphthylenyl, 7H-dibenzofluorenyl, indeno[1,2-9]anthrene, thiophenoindenyl, thiophenofluorenyl, hydrogenated versions thereof (e.g., 4,5,6,7-tetrahydroindenyl, or "$H_4$Ind"), substituted versions thereof, and heterocyclic versions thereof.

Group 15-containing Catalyst Component

One aspect of the present invention includes the use of so called "Group 15-containing" catalyst components as described herein as a desirable catalyst component, either alone or for use with a metallocene or other olefin polymerization catalyst component. Generally, "Group 15-containing catalyst components", as referred to herein, include Group 3 to Group 12 metal complexes, wherein the metal is 2 to 8 coordinate, the coordinating moiety or moieties including at least two Group 15 atoms, and up to four Group 15 atoms. In one embodiment, the Group 15-containing catalyst component is a complex of a Group 4 metal and from one to four ligands such that the Group 4 metal is at least 2 coordinate, the coordinating moiety or moieties including at least two nitrogens. Representative Group 15-containing compounds are disclosed in, for example, WO 99/01460; EP A1 0 893 454; U.S. Pat. No. 5,318,935; U.S. Pat. No. 5,889,128; U.S. Pat. No. 6,333,389 B2 and U.S. Pat. No. 6,271,325 B1.

In one embodiment, the Group 15-containing catalyst components useful in embodiments of the present invention include Group 4 imino-phenol complexes, Group 4 bis(amide) complexes, and Group 4 pyridyl-amide complexes that are active towards olefin polymerization to any extent.

Activator

As used herein, the term "activator" is defined to be any compound or combination of compounds, supported or unsupported, which can activate a single-site catalyst compound (e.g., metallocenes, Group 15-containing catalysts), such as by creating a cationic species from the catalyst component. Typically, this involves the abstraction of at least one leaving group (X group in the formulas/structures above) from the metal center of the catalyst component. The catalyst components of embodiments of the present invention are thus activated towards olefin polymerization using such activators. Embodiments of such activators include Lewis acids such as cyclic or oligomeric poly(hydrocarbylaluminum oxides) and so called non-coordinating activators ("NCA") (alternately, "ionizing activators" or "stoichiometric activators"), or any other compound that can convert a neutral metallocene catalyst component to a metallocene cation that is active with respect to olefin polymerization.

It is within the scope of this invention to use Lewis acids such as alumoxane (e.g., "MAO"), modified alumoxane (e.g., "TIBAO"), and alkylaluminum compounds as activators, and/or ionizing activators (neutral or ionic) such as tri (n-butyl)ammonium tetrakis(pentafluorophenyl)boron and/or a trisperfluorophenyl boron metalloid precursors to activate metallocenes described herein. MAO and other aluminum-based activators are well known in the art. Ionizing activators are well known in the art and are described by, for example, Eugene You-Xian Chen & Tobin J. Marks, Cocatalysts for Metal-Catalyzed Olefin Polymerization: Activators, Activation Processes, and Structure-Activity Relationships 100(4) Chemical Reviews 1391-1434 (2000). The activators may be associated with or bound to a support, either in association with the catalyst component (e.g., metallocene) or separate from the catalyst component, such as described by Gregory G. Hlatky, Heterogeneous Single-Site Catalysts for Olefin Polymerization 100(4) Chemical Reviews 1347-1374 (2000).

Ziegler-Natta Catalyst Component

The catalyst composition may comprise a catalyst component, which is (or includes) a non-metallocene compound. In an embodiment, the catalyst component comprises a Ziegler-Natta catalyst compound, such as disclosed in Ziegler Catalysts 363-386 (G. Fink, R. Mulhaupt and H. H. Brintzinger, eds., Springer-Verlag 1995); or in EP 103 120; EP 102 503; EP 0 231 102; EP 0 703 246; RE 33,683; U.S. Pat. No. 4,302,565; U.S. Pat. No. 5,518,973; U.S. Pat. No. 5,525,678; U.S. Pat. No. 5,288,933; U.S. Pat. No. 5,290,745; U.S. Pat. No. 5,093,415 and U.S. Pat. No. 6,562,905. Examples of such catalysts include those comprising Group 4, 5 or 6 transition metal oxides, alkoxides and halides, or oxides, alkoxides and halide compounds of titanium, zirconium or vanadium; optionally in combination with a magnesium compound, internal and/or external electron donors (alcohols, ethers, siloxanes, etc.), aluminum or boron alkyl and alkyl halides, and inorganic oxide supports.

Conventional-type transition metal catalysts are those traditional Ziegler-Natta catalysts that are well known in the art. Examples of conventional-type transition metal catalysts are discussed in U.S. Pat. Nos. 4,115,639, 4,077,904, 4,482,687, 4,564,605, 4,721,763, 4,879,359 and 4,960,741. The conventional-type transition metal catalyst compounds that may be used in the present invention include transition metal compounds from Groups 3 to 17, or Groups 4 to 12, or Groups 4 to 6 of the Periodic Table of Elements.

These conventional-type transition metal catalysts may be represented by the formula: $MR_x$, where M is a metal from Groups 3 to 17, or a metal from Groups 4 to 6, or a metal from Group 4, or titanium; R is a halogen or a hydrocarbyloxy group; and x is the valence of the metal M. Examples of R include alkoxy, phenoxy, bromide, chloride and fluoride. Examples of conventional-type transition metal catalysts where M is titanium include $TiCl_4$, $TiBr_4$, $Ti(OC_2H_5)_3Cl$, $Ti(OC_2H_5)Cl_3$, $Ti(OC_4H_9)_3Cl$, $Ti(OC_3H_7)_2Cl_2$, $Ti(OC_2H_5)_2Br_2$, $TiCl_3.1/3AlCl_3$ and $Ti(OC_{12}H_{25})Cl_3$.

Conventional-type transition metal catalyst compounds based on magnesium/titanium electron-donor complexes that are useful in embodiments of the invention are described in, for example, U.S. Pat. Nos. 4,302,565 and 4,302,566. Catalysts derived from Mg/Ti/Cl/THF are also contemplated, which are well known to those of ordinary skill in the art. One example of the general method of preparation of such a catalyst includes the following: dissolve $TiCl_4$ in THF, reduce the compound to $TiCl_3$ using Mg, add $MgCl_2$, and remove the solvent.

Conventional-type cocatalyst compounds for the above conventional-type transition metal catalyst compounds may be represented by the formula $M^3M^4{}_vX^2{}_cR^3{}_{b-c}$, wherein $M^3$ is a metal from Group 1 to 3 and 12 to 13 of the Periodic Table of Elements; $M^4$ is a metal of Group 1 of the Periodic Table of Elements; v is a number from 0 to 1; each $X^2$ is any halogen; c is a number from 0 to 3; each $R^3$ is a monovalent hydrocarbon radical or hydrogen; b is a number from 1 to 4; and wherein b minus c is at least 1. Other conventional-type organometallic cocatalyst compounds for the above conventional-type transition metal catalysts have the formula $M^3R^3{}_k$, where $M^3$ is a Group IA, IIA, IIB or IIIA metal, such as lithium, sodium, beryllium, barium, boron, aluminum, zinc, cadmium, and gallium; k equals 1, 2 or 3 depending upon the valency of $M^3$ which valency in turn normally depends upon the particular Group to which $M^3$ belongs; and each $R^3$ may be any monovalent radical that include hydrocarbon radicals and hydrocarbon radicals containing a Group 13 to 16 element like fluoride, aluminum or oxygen or a combination thereof.

EXAMPLES

Example 1

This example describes preparation of a 50:50 (wt %) blend (Sample 3) of two different polyethylene resins, specifically, a bimodal polyethylene resin (Sample 1) and a unimodal polyethylene resin (Sample 2). The Sample 1 resin was prepared in a single gas phase reactor from a mixed catalyst system, wherein the two catalysts were 2,4,6 trimethylephenyl zirconium dibenzyl (for generating the higher molecular weight component of the bimodal polyethylene composition) and bis(n-propyl cyclopentadienyl) zirconium dichloride (for generating the lower molecular weight component). The Sample 2 resin was DGDP-6097, a single gas-phase unimodal high density polyethylene product from Chrome based catalyst and Dow commercial HDPE film product. Granules of the Sample 1 resin were mixed and compounded with additives, namely Irganox® 1076 (1,000 ppm); Irgafos® 168 (1,500 ppm); and CaSt (750 ppm) on a Prodex single screw extruder with two mixing heads. The compounded Sample 1 resin was then dry blended with the unimodal resin (Sample 2), to form blended Sample 3. Resin properties and Size Exclusion Chromotography (SEC) data of each Sample are shown in Table 1. Note the spread of Sample 3, the blend composition, has been reduced to 37.9 as compared to the spread of 65.3 for Sample 1, a bimodal polyethylene.

TABLE 1

|  | Sample: | | |
| --- | --- | --- | --- |
|  | 1 | 2 | 3 |
| MI (I$_2$), g/10 min. | 0.067 | 0.081 | 0.078 |
| FI(I$_{21}$), g/10 min. | 7.6 | 10.67 | 8.76 |
| MFR (I$_{21}$/I$_2$) | 115 | 132.5 | 113 |
| Density (g/cc) | 0.9542 | 0.9491 | 0.9521 |
| Exp. Mn: | 5,626 | 13,749 | 9,846 |
| Exp. Mw: | 288,125 | 277,386 | 279,037 |
| Exp. Mw/Mn: | 51.21 | 20.18 | 28.34 |
| Calc. Mn: | 5,450 |  | 8,397 |
| Calc. Mw: | 287,954 |  | 278,789 |
| Calc. Mw/Mn: | 52.83 |  | 33.20 |
| LMW Mn: | 2,592 |  | 3,714 |
| LMW Mw: | 8,111 |  | 12,375 |
| LMW Mw/Mn: | 3.13 |  | 3.33 |
| LMW Wt %: | 46.34% |  | 41.72% |
| HMW Mn: | 115,024 |  | 86,131 |
| HMW Mw: | 529,640 |  | 469,503 |
| HMW Mw/Mn: | 4.60 |  | 5.45 |
| HMW Wt %: | 53.66% |  | 58.28% |
| Spread (HMW MW/LMW MW) | 65.3 | NA | 37.9 |

Samples 1 and 3 were formed into films. They were both film-extruded on an Alpine film extrusion line, which was equipped with a 50 mm, 18:1 L/D screw, 100 mm annular die (1 mm die gap). The temperature profile (degrees F) was set at 390/400/400/400/410/410/410/410 for zones 1/2/3/4/5/6/7/8. Zones 1 and 2 are for screws. Zones 3, 4 and 5 are for adapter block. Zones 6, 7 and 8 are for die. Blow-up ratio (diameter of blown bubble divided by die diameter) was maintained at 4.0 throughout the runs. The take-up speed was 92 fpm and 184 fpm respectively, for 1.0 mil and 0.5 mil films. Cooling air flow rate was adjusted to maintain the frost line height ratio at 9.0. The frost line height ratio is a ratio between the height of frost line and the die diameter. At a constant output rate, the extrusion head pressure decreased or remained the same depending on the slight changes in flow indices of each composition. Table 2 summarizes the film extrusion conditions.

TABLE 2

| Die set temp. (° F.) | 410 |
| --- | --- |
| Screw RPM | 93 |
| Screw amps | 62 |
| Head pressure (psi) | 8,500 |
| Rate (lb/hr) | 95 |
| FAR (film appearance rate) | +40 |
| BUR (blow-up ratio) | 4 |
| FHR* (Frost-line Height/Die Diameter) | 9 |

The Sample 1 film made using the procedure described above had hazy lines dispersed all over the film surface. The bubble became unstable, moving up and down, as the line speed reached 170 fpm. Collecting even 0.5 mil film at a line speed of 170 fpm was difficult. The Maximum Line Speed where a stable bubble can be maintained was 170 fpm.

The Sample 3 film (made from the 50:50 blend) showed substantial improvement. Soon after the transition from sample 1 to sample 3, the hazy lines disappeared and a nice homogeneous film texture was observed. The bubble became much more stable. A 0.5 mil film was collected effortlessly at 170 fpm due to a very stable bubble. The line speed was then increased to 220 fpm from which a 0.3-0.35 mil film sample was collected, and then increased further to 240 fpm. The Maximum Line Speed was 240 fpm for the composition used to form Sample 3.

Example 2

This example describes preparation of additional blends that contain different proportions of bimodal and unimodal polyethylene resins. This example also discusses films made from those blends; and the testing of those films. The bimodal polyethylene (Sample 4) was made using a mixed catalyst. Specifically, in a 5.6 molar ratio, the mixed catalyst was a combination of bis(2-(pentamethyl-phenylamido)ethyl) amine zirconium dibenzyl (for the high molecular weight component and bis(n-propyl cyclopentadienyl) zirconium dichloride (for the lower molecular weight component). The reactor conditions were 85° C., 0.0035 H$_2$/C$_2$ with a 0.0070 C$_6$/C$_2$ ratio.

The Sample 4 resin had been compounded with the following additives: Irganox® 1076 (1,000 ppm); Irgafos® 168 (1,500 ppm); and CaSt (1,500 ppm). Sample 4 was then blended with different amounts (16.3 wt %, 33.4 wt %, and 50 wt %) of a unimodal resin, namely, DGDA-5120 (Sample 5), a Dow commercial sheet product, to form blend Samples 6, 7, and 8. Table 2 describes resin properties and SEC data of the various Samples. All the Samples 6, 7 and 8 exhibited lower spread than the Sample 4, a bimodal polyethylene.

TABLE 3

|  | Sample: | | | | |
| --- | --- | --- | --- | --- | --- |
|  | 4 | 5 | 6 | 7 | 8 |
| MI (I2), g/10 min. | 0.059 | 0.098 | 0.053 | 0.058 | 0.056 |
| FI(I21), g/10 min. | 7.5 | 12.7 | 7.02 | 7.69 | 8.31 |
| MFR (I21/I2) | 127.6 | 129 | 131.4 | 133.1 | 147.3 |
| Density (g/cc) | 0.9505 | 0.9508 | 0.9507 | 0.9505 | 0.9506 |
| Exp. Mn: | 4,351 | 17,540 | 4,659 | 4,961 | 5,565 |
| Exp. Mw: | 324,588 | 180.173 | 291,588 | 255,741 | 226,135 |
| Exp. Mw/Mn: | 74.60 | 10.27 | 62.59 | 51.55 | 40.64 |
| Calc. Mn: | 4,311 |  | 4,712 | 4,938 | 5,319 |
| Calc. Mw: | 322,732 |  | 287,103 | 253,428 | 223,343 |
| Calc. Mw/Mn: | 74.86 |  | 60.93 | 51.32 | 41.99 |
| LMW Mn: | 2,024 |  | 2,149 | 2,192 | 2,137 |
| LMW Mw: | 6,998 |  | 8,350 | 9,059 | 8,971 |
| LMW Mw/Mn: | 3.46 |  | 3.89 | 4.13 | 4.20 |

TABLE 3-continued

|  | Sample: | | | | |
| --- | --- | --- | --- | --- | --- |
|  | 4 | 5 | 6 | 7 | 8 |
| LMW Wt %: | 46.04% |  | 44.44% | 42.98% | 38.19% |
| HMW Mn: | 121,177 |  | 101,852 | 88,755 | 66,770 |
| HMW Mw: | 592,146 |  | 510,045 | 437,612 | 355,815 |
| HMW Mw/Mn: | 4.89 |  | 5.01 | 4.93 | 5.33 |
| HMW Wt %: | 53.96% |  | 55.56% | 57.02% | 61.81% |
| Spread (HMW MW/LMW MW) | 84.6 | NA | 61.08 | 48.3 | 39.66 |

Example 3

This example describes films made from different polymer compositions. Various samples described in Example 2 were film-extruded at a rate of 100 pounds per hour using the Alpine film extrusion line and procedure described above in Example 1. Specifically, films were prepared using Samples 4, 6, 7 and 8. All the compositions, including Sample 4 (neat resin), were melt compounded.

A film made using Sample 4 exhibited poor film texture with prevalent hazy lines on the film surface. However, no gel could be seen in the film sample. The bubble was not stable at a 1.0 mil condition (89 fpm) and showed side-to-side oscillation. As the line speed was increased to 175 fpm, the bubble became very unstable, displaying up-and-down movement. Obtaining a 0.5 mil film was difficult. Accordingly, it was determined that the Maximum Line Speed was less than 175 fpm.

Some improvement was observed for film made from Sample 6 (16.3 wt % blend). The film had good texture and bubble stability, and 0.5 mil film was easily collected. However, the Maximum Line Speed was only approximately 185 fpm.

Marked improvement was seen for film made from Sample 7 (33.4 wt % blend), which had better film texture. The Maximum Line Speed was determined to be 200 fpm.

The best results were obtained with Sample 8 (50 wt % blend) from which a 0.5 mil film was made, having excellent appearance quality. Moreover, a dramatically improved Maximum Line Speed was greater than 220 fpm.

Unlike those samples that were melt compounded, a dry-blended composition (Sample 9) was prepared, made from the same components and amounts as Sample 3. This dry blended product was prepared to determine the existence of any possible effects during melt compounding, such as cross-linking on the improvement in bubble stability and film texture. That tumble mixed 50:50 blend was then fed to a hopper, and a film was made. The texture of the resulting film was homogeneous although not as good as that of the melt blended product (Sample 3). The dry blended product demonstrated a Maximum Line Speed of over 250 fpm. This proved that regardless of the preparation method, either melt compounded or dry-blended, the blend compositions enhance the bubble stability and thus the Maximum Line Speed.

Both of the bimodal resins (Samples 1 and 4) had resin flow properties of 6-9 FI and 100-160 MFR. However, neither of them produced good quality film or good bubble stability. Based on the two separate blend studies, the importance of spread control was demonstrated for meeting important film product attributes such as good film quality and good bubble stability.

Example 4

This example describes preparation of additional blends that contain different proportions of bimodal and unimodal polyethylene resins. The base resin was a bimodal polyethylene (Sample 10), having 10.6 FI and 132.5 MFR, made using a dual catalyst that consists of a titanium based Ziegler-Natta catalyst and a metallocene catalyst, bis(n-butyl Cp) Zr dichloride. Sample 10 resin was then physically blended with different amounts (10 wt %, 20 wt %, and 30 wt %) of a unimodal resin, namely, DGDA-5120, a Dow UCAT commercial sheet product, to form blend Samples 11, 12 and 13. The physical blends were compounded on the Prodex line. To maintain the same thermal history, the base resin (Sample 10) was re-compounded. The different resin compositions were then film extruded on the Alpine line using the equipment and procedures described in Example 1. Separately, flow properties and SEC of the compounds including the base resin were measured. The spread of the bimodal resin was reduced by addition of the unimodal resins. However, the overall flow properties and split remained virtually constant for the blend compounds. Table 4 describes resin properties and SEC data.

TABLE 4

|  | Sample: | | | |
| --- | --- | --- | --- | --- |
|  | 10 | 11 | 12 | 13 |
| $I_{21}$ | 10.6 | 10.3 | 10.5 | 9.9 |
| $I_3$ | 0.08 | 0.074 | 0.074 | 0.067 |
| MFR ($I_{21}/I_2$) | 132.5 | 139.1 | 141.9 | 147.7 |
| Exp. Mn: | 5,988 | 6,749 | 6,467 | 7,100 |
| Exp. Mw: | 254,405 | 248,870 | 198,606 | 225,606 |
| Exp. Mw/Mn: | 42.49 | 36.88 | 30.71 | 31.78 |
| Calc. Mn: | 5,492 | 6,086 | 5,797 | 6,370 |
| Calc. Mw: | 251,863 | 246,721 | 198,540 | 222,217 |
| Calc. Mw/Mn: | 45.86 | 40.54 | 34.25 | 34.88 |
| LMW Mn: | 2,423 | 2,742 | 2,690 | 2,771 |
| LMW Mw: | 8,976 | 10,251 | 10,454 | 12,102 |
| LMW Mw/Mn: | 3.70 | 3.74 | 3.89 | 4.37 |
| LMW Wt %: | 42.38% | 43.27% | 44.42% | 41.32% |
| HMW Mn: | 80,187 | 87,608 | 75,357 | 74,650 |
| HMW Mw: | 430,496 | 427,072 | 348,875 | 370,153 |
| HMW Mw/Mn: | 5.37 | 4.87 | 4.63 | 4.96 |
| HMW Wt %: | 57.62% | 56.73% | 55.58% | 58.68% |
| Spread | 47.96 | 41.66 | 33.37 | 30.58 |

The film extrusion tests confirmed that the higher amounts of unimodal resin, corresponding to lower overall spread values, provided better results than either the unblended bimodal resin or blends containing lower amounts of unimodal resin (or higher spread). The Maximum Line Speed and spread value for each sample were 170 fpm and 48 for neat resin Sample 10; 180 fpm and 42 for blend Sample 11; 200 fpm and 33 for blend Sample 12; and 270 fpm and 30 for Sample 13. Film homogeneity improved in correspondence with the reduction in spread; and hazy lines present in the unblended, neat resin film were less prominent in the higher spread blend (Sample 11), and absent in the lower spread samples (Samples 12 and 13).

Example 5

This example was similar to Example 4 except a different bimodal base resin was used for form the film compositions. Specifically, Sample 14 had 8.4 FI and 114 MFR. Samples 15, 16 and 17 were blends containing 10% wt, 20% wt and 30% wt, respectively, of unimodal resin DGDA-5120. As observed in Example 4, the spread was reduced in proportion to the amount of unimodal that was added. However, the overall flow properties and split remained virtually constant for the blend compounds. Table 5 describes resin properties and SEC data of the various Samples.

TABLE 5

| | Sample: | | | |
|---|---|---|---|---|
| | 14 | 15 | 16 | 17 |
| $I_{21}$ | 8.42 | 8.26 | 9.28 | 8.4 |
| $I_3$ | 0.074 | 0.07 | 0.077 | 0.069 |
| MFR ($I_{21}$)/$I_2$) | 114 | 117.8 | 121 | 121.5 |
| Exp. Mn: | 7,614 | 7,970 | 8,284 | 9,394 |
| Exp. Mw: | 305,062 | 290,033 | 272,048 | 270,889 |
| Exp. Mw/Mn: | 40.07 | 36.39 | 32.84 | 28.84 |
| Calc. Mn: | 6,513 | 6,911 | 7,147 | 8,182 |
| Calc. Mw: | 300,629 | 285,269 | 266,862 | 262,851 |
| Calc. Mw/Mn: | 46.16 | 41.28 | 37.34 | 32.13 |
| LMW Mn: | 2,695 | 2,731 | 2,890 | 3,100 |
| LMW Mw: | 8,318 | 8,619 | 9,312 | 10,533 |
| LMW Mw/Mn: | 3.09 | 3.16 | 3.22 | 3.40 |
| LMW Wt %: | 39.73% | 37.54% | 38.17% | 35.27% |
| HMW Mn: | 98,741 | 86,183 | 78,859 | 76,484 |
| HMW Mw: | 493,342 | 451,540 | 425,886 | 400,340 |
| HMW Mw/Mn: | 5.00 | 5.24 | 5.40 | 5.23 |
| HMW Wt %: | 60.27% | 62.46% | 61.83% | 64.73% |
| Spread | 59.31 | 52.38 | 45.74 | 38.00 |

All the samples exhibited the same behavior as those in Example 5. The Maximum Line Speed and spread value for each sample were 190 fpm and 59 for neat resin Sample 14; 205 fpm and 52 for Sample 15; 200 fpm and 46 for blend Sample 16; and 275 fpm and 38 for Sample 17.

What is claimed is:

1. A process for producing a film, comprising:
    forming a film from a blended polyolefin composition at a line speed of at least 170 feet per minute, wherein the blended polyolefin composition comprises:
        (a) a bimodal polyethylene component that includes a high molecular weight polyethylene component having a high average molecular weight (MWHMW) and a low molecular weight polyethylene component having a low average molecular weight (MWLMW), wherein the ratio of the high average molecular weight to the low average molecular weight (MWHMW:MWLMW) is 20 or more, wherein the high and low molecular weight polyethylene components of the bimodal polyethylene component are formed in a single reactor, and
        (b) a unimodal polyethylene component that comprises more than 15 wt % of the composition to form a blended polyethylene composition.

2. The process of claim 1, further comprising admixing the bimodal polyethylene component with at least one additive.

3. The process of claim 1, further comprising admixing the bimodal polyethylene component and the unimodal polyethylene component to form the blended polyolefin composition.

4. The process of claim 1, wherein forming a film comprises at least one of extruding and blow molding.

5. The process of claim 4, wherein forming a film further comprises feeding the blended polyolefin composition to an extruder.

6. The process of claim 4, wherein forming a film further comprises melting the blended polyolefin composition to form a blended polyolefin melt.

7. The process of claim 1, wherein forming a film further comprises maintaining a blow-up ratio of at least 4.0 during the formation of the film.

8. The process of claim 1, wherein forming a film further comprises maintaining a frost line height ratio of least 9.0 during the formation of the film.

9. The process of claim 1, wherein the blended polyolefin composition has a maximum line speed of 185 fpm.

10. The process of claim 1, wherein the blended polyolefin composition has a maximum line speed of 220 fpm.

11. The process of claim 1, wherein the blended polyolefin composition has a maximum line speed of 275 fpm.

12. A process for producing polyolefin films, comprising:
    admixing: (a) a bimodal polyethylene component that includes a high molecular weight polyethylene component having a high average molecular weight (MWHMW) and a low molecular weight polyethylene component having a low average molecular weight (MWLMW), wherein the ratio of the high average molecular weight to the low average molecular weight (MWHMW:MWLMW) is 20 or more, wherein the high and low molecular weight polyethylene components of the bimodal polyethylene component are formed in a single reactor, and (b) a unimodal polyethylene component that comprises more than 15 wt % of the composition to form a blended polyethylene composition; and
    forming a film from the blended polyethylene composition;
    wherein the film is formed at a line speed of at least 170 feet per minute.

13. The process of claim 12, further comprising admixing the bimodal polyethylene component with at least one additive.

14. The process of claim 12, further comprising admixing the bimodal polyethylene component and the unimodal polyethylene component to form the blended polyolefin composition.

15. The process of claim 12, wherein forming a film comprises at least one of extruding and blow molding.

16. The process of claim 15, wherein forming a film further comprises feeding the blended polyolefin composition to an extruder.

17. The process of claim 15, wherein forming a film further comprises melting the blended polyolefin composition to form a blended polyolefin melt.

18. The process of claim 12, wherein forming a film further comprises maintaining a blow-up ratio of at least 4.0 during the formation of the film.

19. The process of claim 12, wherein forming a film further comprises maintaining a frost line height ratio of at least 9.0 during the formation of the film.

20. The process of claim 12, wherein the blended polyethylene composition has a maximum line speed of 185 fpm.

21. The process of claim 12, wherein the blended polyethylene composition has a maximum line speed of 220 fpm.

22. The process of claim 12, wherein the blended polyethylene composition has a maximum line speed of 275 fpm.

* * * * *